United States Patent
Bai et al.

(10) Patent No.: US 7,684,633 B2
(45) Date of Patent: Mar. 23, 2010

(54) SYSTEM AND METHOD FOR IMAGE FILE SIZE CONTROL IN SCANNING SERVICES

(75) Inventors: Yingjun Bai, Pittsford, NY (US); Xing Li, Webster, NY (US)

(73) Assignee: Xerox Corporation, Norwalk, CT (US)

(*) Notice: Subject to any disclaimer, the term of this patent is extended or adjusted under 35 U.S.C. 154(b) by 1303 days.

(21) Appl. No.: 11/168,128

(22) Filed: Jun. 28, 2005

(65) Prior Publication Data

US 2006/0291732 A1 Dec. 28, 2006

(51) Int. Cl.
*G06K 9/00* (2006.01)

(52) U.S. Cl. .............. 382/252; 382/232; 382/173; 382/191; 382/176; 382/308

(58) Field of Classification Search .......... 382/252, 382/232, 173, 175, 176, 191, 308, 162; 358/465, 358/466

See application file for complete search history.

(56) References Cited

U.S. PATENT DOCUMENTS

| | | | |
|---|---|---|---|
| 5,048,109 A | 9/1991 | Bloomberg et al. | |
| 5,515,180 A * | 5/1996 | Maeda et al. | 358/3.15 |
| 6,275,304 B1 | 8/2001 | Eschbach et al. | |
| 6,385,344 B2 * | 5/2002 | Irie et al. | 382/237 |
| 6,735,337 B2 * | 5/2004 | Lee et al. | 382/220 |
| 7,139,908 B2 * | 11/2006 | Hamamoto et al. | 713/2 |
| 2004/0190019 A1 * | 9/2004 | Li et al. | 358/1.9 |
| 2004/0190045 A1 * | 9/2004 | Matsuhara et al. | 358/1.15 |
| 2005/0270582 A1 * | 12/2005 | Hara | 358/2.1 |
| 2006/0256124 A1 * | 11/2006 | Kuo et al. | 345/589 |

* cited by examiner

*Primary Examiner*—Samir A. Ahmed
*Assistant Examiner*—Ali Bayat
(74) *Attorney, Agent, or Firm*—Duane C. Basch; Basch & Nickerson LLP

(57) ABSTRACT

A system and method for controlling the work flow or processing of scanned images is disclosed. The system and method identify appropriate image processing techniques, particularly techniques well-suited to enable image compression yet maintain image quality so as to facilitate the storage and transmission of scanned image data.

16 Claims, 6 Drawing Sheets

SYSTEM AND METHOD FOR IMAGE FILE SIZE CONTROL IN SCANNING SERVICES

Disclosed are a system and method for processing images, and more particularly, compression of such images to facilitate the efficient storage and transmission of scanned image data.

BACKGROUND AND SUMMARY

As the use of scanning services devices becomes more prevalent, it is also the case that users of such system require assistance in defining the parameters of images being created through scanning operations. Furthermore, one of the significant factors being treated in such systems is the explosive growth of file sizes for scanned images. While it is known to use image compression methods to process image data and reduce the size thereof, such methods do not always result in desired reductions in file size.

In view of such problems, the system and methods described herein provide for a post-error diffusion operation to be applied to error diffused photographic images or segments, and a morphological filtering operation to be applied to text segments. One such method is to rearrange the pixels in the error diffused binary image to make it more compression friendly. Such a process also works for mixed content scanned images, as long as segmentation is employed to separate the text and photo portions of the page.

Disclosed is a method for controlling image quality and file size of a scanned document, comprising: receiving a scanned input image, said image including an error-diffused portion and a text portion; segmenting the image into a plurality of regions, including at least one continuous tone region and one text region; processing at least one of said plurality of regions differently than the remaining regions in accordance with a user selection of output quality, wherein said processing includes pixel clustering of at least one of said regions; merging the processed regions to produce a representative image; and compressing the representative image.

Also disclosed is a method for controlling image characteristics, comprising receiving a scanned input image; segmenting the image to produce a segmented image; processing the segmented image in accordance with a user selection of an image characteristic; producing a representative image that includes at least a processed portion; and compressing the representative image.

Further disclosed is a scanning services system for controlling image characteristics, comprising a subsystem for digitizing a document and producing a representation thereof in the form of digital image data; and an image processor for receiving the digital image data and producing a compressed image in accordance with a user selection of an image characteristic, said characteristic indicating a manner of processing at least a portion of the compressed image.

Figure 1:
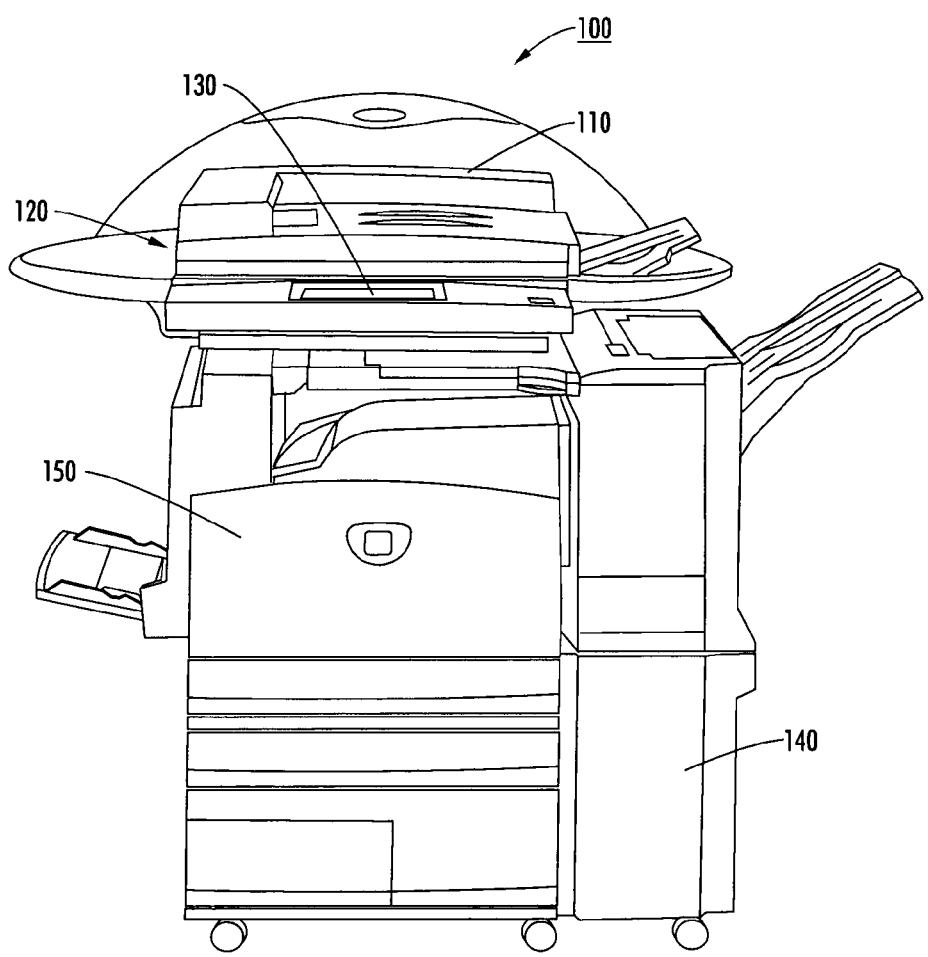
FIG. 1 is an illustrative example of a multipurpose device suitable for operation of the methods disclosed herein.

The system and method will be described in connection with a preferred embodiment, however, it will be understood that there is no intent to limit the embodiment(s) described. On the contrary, the intent is to cover all alternatives, modifications, and equivalents as may be included within the spirit and scope of the disclosure as defined by the appended claims.

DETAILED DESCRIPTION

For a general understanding of the disclosed system and method, reference is made to the drawings. In the drawings, like reference numerals have been used throughout to designate identical elements.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

"Memory circuitry" or "memory" is any circuitry or data storage medium that can store data, and may include local and remote memory and input/output devices. Examples include semiconductor ROMs, RAMs, and storage medium access devices with data storage media that they can access.

Figure 2:
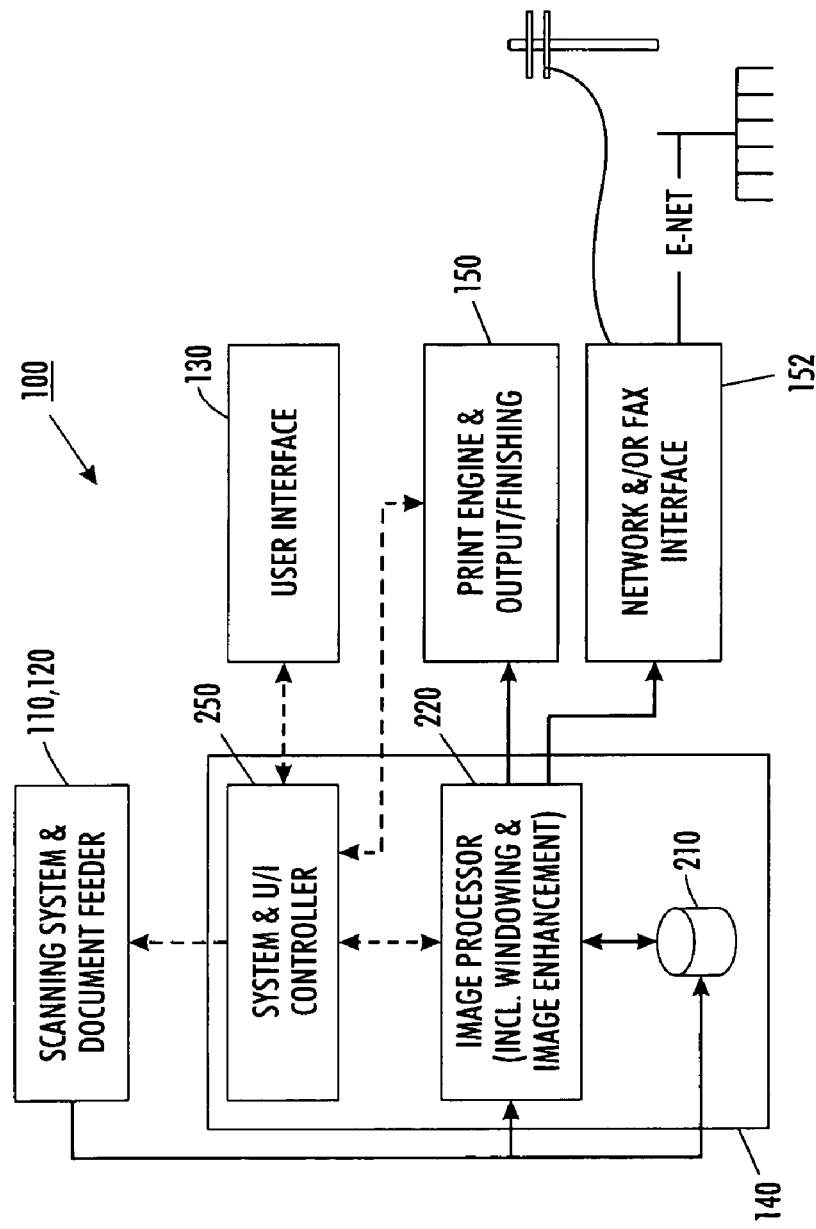
FIG. 2 is a block diagram illustrating various aspects of the device of FIG. 1.

Referring now to FIGS. 1 and 2 there are shown alternative views of a multi-function digital reprographic device 100 that provides an exemplary embodiment for aspects of the disclosed system and method. In particular device 100 is capable of providing multi-function document scanning, storage, faxing/e-mailing, and printing functions. In one embodiment device 100 includes a scanning subsystem 120 and an associated document feeder 130, suitable for feeding a plurality of hard copy documents to and through the scanning subsystem. Output of the scanning subsystem, in the form of digital image data (e.g., rasterized data) is generated by the scanning system and input to the device control circuitry 140 for processing and/or storage.

Once processed, the image data may be output from the system, either in the form of processed image data, or in the form of a hard copy rendering of the data on a substrate. Rendering in hard copy form is accomplished by passing the image data to a printing or output engine 150, that prints the black and white or color document using one of several known printing methods. Storage or output in a digital format includes processing of the image data to produce an image file in a conventional image format (e.g., JPG, TIFF, GIF, PDF, etc.). As will be appreciated the system may further process the image in accordance with system and/or user settings to control the processing and storage/forwarding of the scanned image data or file.

As more specifically illustrated in FIG. 2, the control circuitry will include, among other subsystems, a system and user interface control circuit 250 including a processor (e.g., Pentium) and associated program memory indicating the control processes to be executed. Linked to the system controller 250 is an image processing system 220, that is, in one embodiment, an Electronics for Imaging, Inc. (EFI) Controller linked to the print engine 150. The EFI controller is a component within the 850 MHz Intel Pentium III computing platform, where the platform includes at least 256 MB printing memory, and a 20 GB Hard drive 210 suitable for storing output produced by the system. The platform is also preferably linked to an external network by a 10/100 Base T Ethernet connection, and may further include a facsimile-capable modem connection to a telephone service as represented by interface 152.

As will be appreciated, the various features and functionality of the device 100 are enabled by computer software and various computing algorithms. In particular, as illustrated in FIGS. 1 and 2, the system controller 250 includes programmatic memory that will produce the various user interface screens and menus that guide a user through the scan/print job process and provide job status to the user via user interface 130. In other words, device 100 further includes a user interface whereby a user can make a plurality of selections relative to the operation of the image processing system. In accordance with the system as described below, at least one of such selections controls the processing of the image relative to the manner and characteristics of a stored or forwarded digital image.

Accordingly, the system and user interface control circuit 250 controls operation of the image processor 220 so as to operate the subsystems and perform the scanning (110, 120), processing (220) and output (150) functions described. More specifically, processor 220 is connected to memory or storage medium (e.g., magnetic disk 210), for receiving the digital image data produced by scanner 120 and processing the image data to produce compressed image files.

Figure 3:
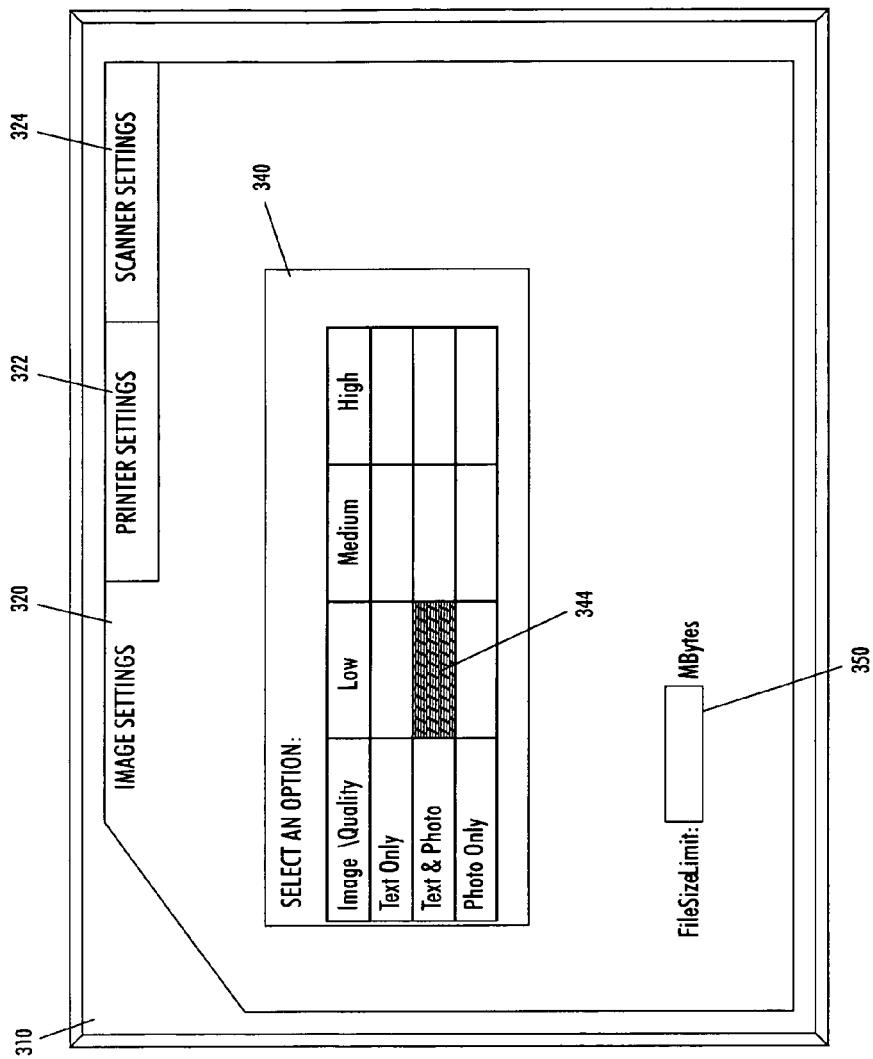
FIG. 3 is an example of a user-interface screen used for input of parameters in accordance with an aspect of the disclosed method.

Having described an exemplary system, reference is now made to FIG. 3, which illustrates a portion of an exemplary user interface screen wherein a user is permitted to select or control the processing of a scanned image in accordance with an image type and/or a compressed file size limitation. More specifically, user interface 310 illustrates a series of user selectable "tabs" 320, 322 and 324 where a user may select a tab to control a particular feature or component of the system 100. As indicated in the figure, tab 320 has been selected and a user is presented with an Image Settings interface, whereby the user may select from a plurality of settings to control or indicate a preference as to the manner in which the image data from scanning system 120 will be processed and stored. As indicated in the table-like region 340, the user may indicate the type of image (left most column) and a desired file size setting (top row), by selecting the corresponding block or region in the matrix. As indicated, the user has selected region 344, which indicates a document image that is a combination of text and photo, and a small file size is desired. It is also possible that a user or a system setting, for example region 350 of the interface, be employed to set an upper limit on the image file size. Such a setting may be employed to automatically control the quality (and therefore file size) selection and subsequently the processing of the image.

In accordance with the user or administrator selected setting for system 100, the following table (Table A) illustrates exemplary processing that would be carried out in the system with respect to the scanned image data and associated image file:

TABLE A

| Image Type | Image Quality | | |
|---|---|---|---|
| | Low | Medium | High |
| Text Only | Text Enhancement; | Text Enhancement | Error Diffused Image |
| Text & Photo | Text Enhancement; Clustering for pictorial | Text Enhancement | Error Diffused Image |
| Photo Only | Clustering for pictorial | Enhancement/ Clustering[1] | Error Diffused Image |

[1]At some printing resolutions, error diffusion processing may result in significant artifact structure, accordingly, the process to be completed may be altered in accordance with the particular printing resolution of the system It will be appreciated that the various options portrayed in user interface 310 enable the user to select from different image processing and file-size combinations, thereby permitting a user's preferences to be employed by the system 100. As it will be appreciated that in most scanning systems, high-quality images require larger file sizes. As will now be described in further detail relative to the processes carried out by system 100, the scanned image data may be segmented into different types of regions, and those regions then processed so as to maintain reasonable image quality while at the same time conserving file space. For example, the high quality output will be an error diffused image, whereas the medium and lower quality (and respectively smaller file size) output to which different treatments or combinations are applied. Accordingly, the operation to be performed while processing the image data are, to at least some extent, the result of segmentation of the image as well as the user-specified intent as determined from the interface 310 or an alternative set of preferences or selections.

Figure 4:
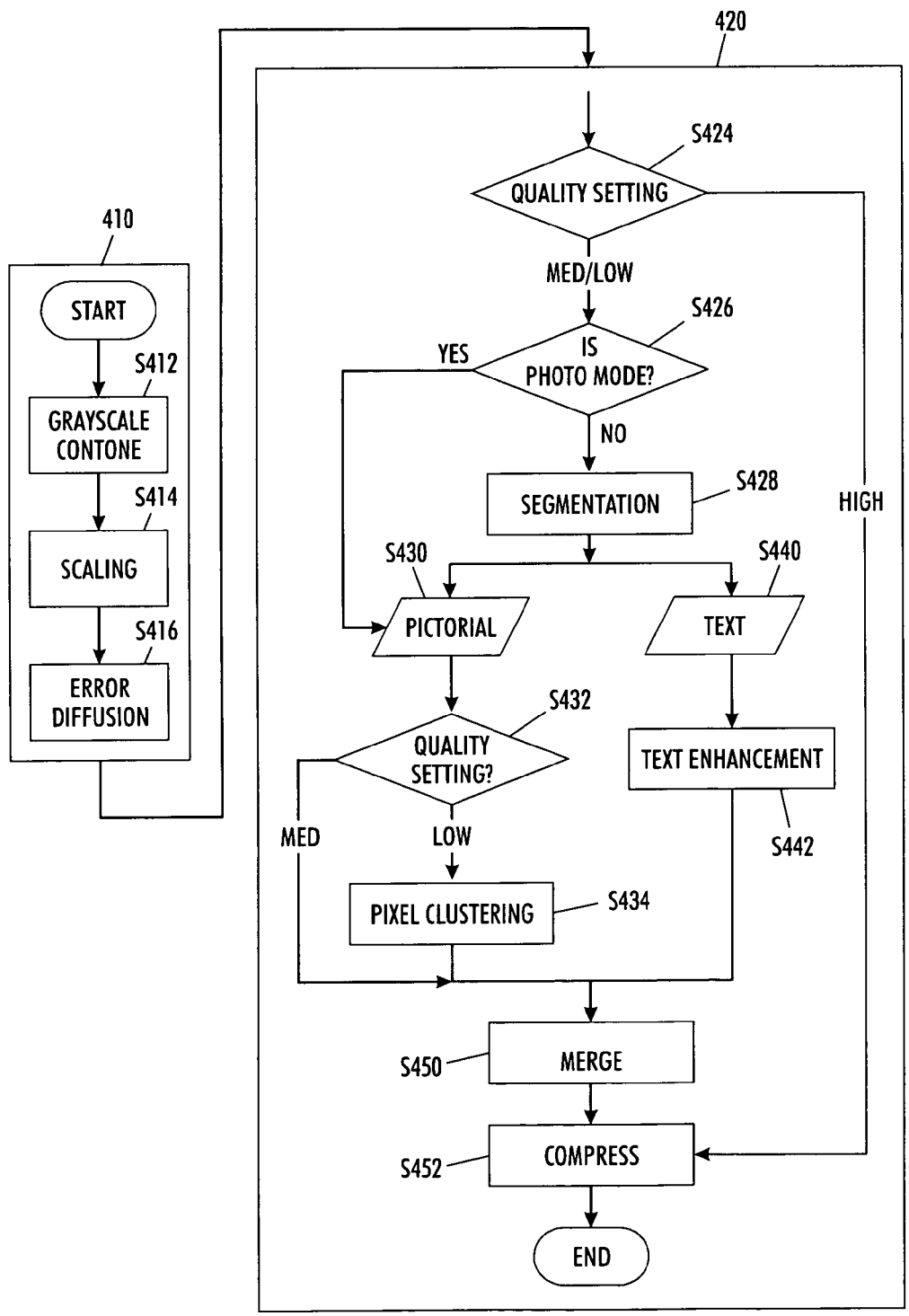
FIG. 4 is a flow diagram indicating various operations performed in accordance with the disclosed method.

Referring now to FIG. 4, there is depicted a flowchart illustrating the processes carried out in system 100. In particular, process 410 represents conventional image processing operations for a scanned image. Process 410 includes scanning a document to produce a grayscale or continuous tone (contone) image S412, following by a scaling operation S414 and then error diffusion of the image data S416. As noted above, the process 410 does not permit adjustment of the process to achieve preferences relative to the nature of the image processing applied and/or file size.

Accordingly, process 420 is added to the method to accommodate such preferences. In particular, process 420 includes first determining an image quality setting at S424. As described above, such a setting may be specified by a user, or may be set by an administrator. Depending upon the image quality setting, processing continues at S426 or S450. At S426, the mode of the scanner or image is characterized, and again the subsequent processing is determined by the selection. In the event the user specified a photo, indicating that the document being scanned consisted of a photograph or continuous tone image over the entire document, processing continues at S430. Alternative, if not photo mode, that processing continues at S428, where the resulting image data is analyzed and segments into photo (continuous tone) and text regions. Subsequently, based upon the nature, or classification, of each region, processing of at least that portion of the image continues at S430 and/or S440. For photo or continuous tone regions, the quality setting is next determined at S432, and for low quality settings, the previously error-diffused data is further processed to cluster the pixels, thereby enabling further reduction in the image size due to improved compression resulting from the pixel clustering at S434.

For non-photo regions, which are thus treated as text (or line art), a text enhancement operation S442 is performed.

After the processing operations described (again relative to the entire image or portions thereof), the segments of the mixed image (text and photo) are merged at S450 and then all images are compressed at S452. The compression operation may be any suitable compression operation, and may include one or more run-length compression algorithms suitable for reducing the size of the image prior to storage in memory and/or transmission. Having described the basic method performed by system 100, attention is now turned to the remaining figures which are employed to describe further details of several processing operations depicted in FIG. 4.

It is known that error-diffused images may be difficult to compress. For some compression methods, the compression result could even be larger than the original uncompressed image, particularly when the image has significant photographic content. As scan services are gaining in popularity (scan-to-e-mail; scan-to-file, etc.), the file size of a scanned image becomes more of a concern particularly as transmitted over a network or in occupying e-mail or network storage space. For a large quantity scan archiving service, the file size sensitivity is further heightened.

In view of such problems, the method described above provides for a post-error diffusion operation to be applied to continuous tone or photographic images or segments. One such method is to rearrange the pixels in the error diffused binary image to make it more compression friendly. Such processing has been demonstrated to result in a file size improvement of approximately fifty-five percent for pure image content. Such a process also works for mixed content scanned images, as long as segmentation is employed to separate the text and photo portions of the page. Of course the average file size saving on mixed content images is highly dependent upon the image.

The disclosed method rearranges the pixel positions of the error diffused, continuous tone regions, to create a fixed pattern and thereby improve the compression performance. Recognizing that moving pixels around (post processing of the error-diffused image) may degrade the image quality, the goal was to seek a compromise that provided reasonable quality but improved compression ratios. The basic concept employed is from the halftoning process—using cluster dot. As employed in the method generally described above, the process of rearranging the pixels comprises the following steps:
 1. tiling the whole image using a predefined halftone cell;
 2. for the area under each halftone cell, counting the number of pixels that are on (assuming "on" has a value of 1, and means black); and
 3. rearranging the pixels inside the halftone cell according to the growth order of the halftone pattern.

The process repeats until the whole image is processed.

Figure 5:
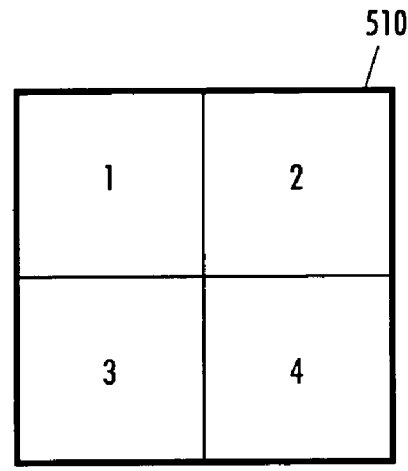
FIGS. 5 and 6 are illustrative examples of halftone cell fill orders.
Figure 6:
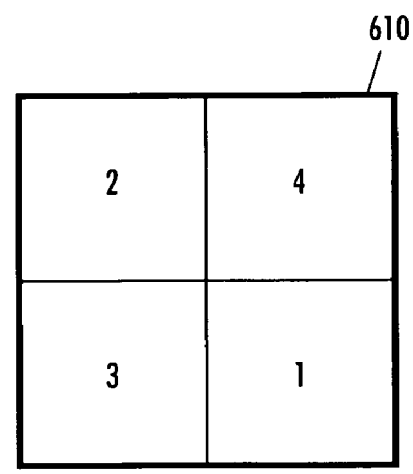

For example, referring to FIG. 5, for a halftone cell 510, the growth pattern is illustrated as 1-2-3-4. Consider the following example. Assume that the halftone cell has a 2×2 pixel size, and with the growth order illustrated in FIG. 5. Hence, for a 2×2 pixel image area, as long as there is one pixel that is on, it will already be put at the upper left corner of the cell. If there are two pixels that are on, then the upper row will be filled. If three pixels are on, then the lower right corner will be off all the time. Although such a cell may not prove to be most visually pleasing, it would, nonetheless assure that, for example when contrasted with cell 610 of FIG. 6, produce greater run-lengths for compression. Accordingly, cell 510 produces the smallest quality degradation and the most compression ratio improvement. For whole page photographic content, the compression improvement is listed in Table B. More specifically, the original error diffused images (left column number indicate original resolution of error-diffused image) and their pixel-rearranged versions using clustering algorithm were compressed using three different binary compression algorithms as represented in the columns. The numbers in the table are the ratios of the two compressed image file sizes, resulting from the images with and without the pixel rearrangement described above. A number that is smaller than one means that clustering algorithm improves the compression ratio.

TABLE B

|  | G4 | Jbig2-huff | Jbig2-arith |
|---|---|---|---|
| Img1@200 × 200 | 0.38 | 0.44 | 0.66 |
| Img1@300 × 300 | 0.35 | 0.40 | 0.59 |
| Img1@400 × 400 | 0.34 | 0.35 | 0.58 |
| Img1@600 × 600 | 0.36 | 0.43 | 0.52 |
| Img2@200 × 200 | 0.34 | 0.34 | 0.61 |
| Img2@300 × 300 | 0.31 | 0.52 | 0.62 |
| Img2@400 × 400 | 0.30 | 0.51 | 0.62 |
| Img2@600 × 600 | 0.29 | 0.54 | 0.56 |
| Average | 0.33 | 0.44 | 0.60 |

It was found that the most efficient compression improvement is achieved by creating long runs of 1's and 0's from the patterns that switched between white and black in a very high frequency for each row. The halftone fill-in-order that is shown in FIG. 5 is one of the orders that can achieve desired results. Moreover, the extent that the algorithm can improve the compression ratio depends on whether the compression is done along the direction that has long run of 1's and 0's when this type of clustering is used.

Attention is now turned to the processing of the text portions of the documents pursuant to the process of FIG. 3. In one embodiment, the text region(s) of the scanned document are morphologically enhanced to achieve good overall rendering. The workflow, having segmented the binary scanned document into text region(s) and photograph region(s) at S428, uses a morphological operation at S442 to enhance the text region—leaving the image portion unchanged. As previously noted the regions are subsequently merged together at S450.

Morphological filtering can be applied to the text image to smooth the text edge, remove the holes inside the text, and connect certain line art objects. Depending on the characteristics of the text, it will be appreciated that different morphologic filtering can be employed. For one scanning embodiment a closing operation with 2×2 template was used to achieve the best result for 300 dpi resolution scans. It should also be appreciated that template size could be resolution dependent if necessary. An exemplary closing operation is described by Eschbach et al. in U.S. Pat. No. 6,275,304, where morphological operations such as erosion and dilation are described as well known (referring to U.S. Pat. No. 5,048, 109 to Bloomberg), both patents being hereby incorporated by reference for their teachings. The morphological operation termed "closing" may be performed by a dilation followed by an erosion.

Figure 7:
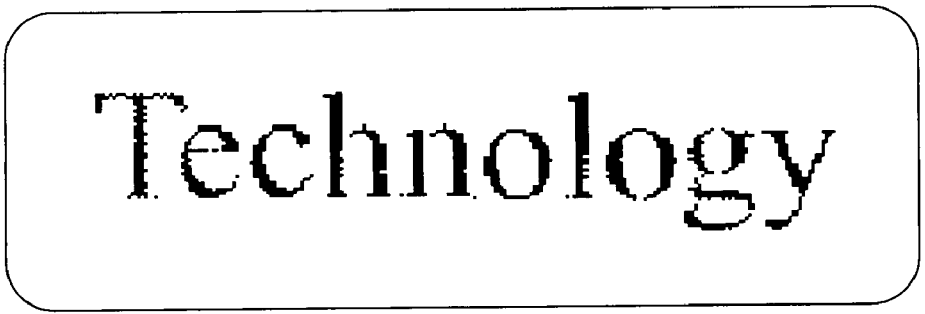
FIGS. 7 and 8, respectively, illustrate parts of images before and after text enhancement.
Figure 8:
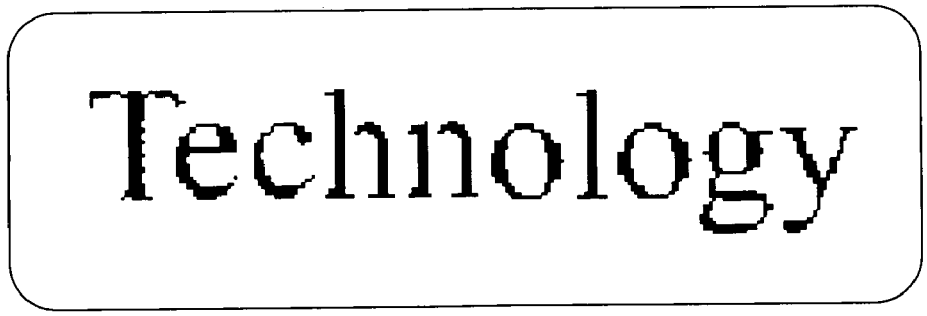

One promising candidate for the enhancement filtering is a template-based filter. The advantage of using template matching instead of a regular morphology operation is that the templates can be "trained" or adjusted to fit best for each product, as the error diffusion algorithm for different products may be different, and thus the filtering operation may need to be different. For example, FIGS. 7 and 8 the images illustrate the part of the images before and after the text enhancement. FIG. 7 illustrates the image in a before text-enhancement state whereas FIG. 8 illustrates the image in an after text-enhancement state.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for controlling image quality and file size of a scanned document, comprising:
   receiving a scanned input image, said image including an error-diffused portion and a text portion;
   segmenting the image into a plurality of regions, including at least one continuous tone region and one text region;
   processing at least one of said plurality of regions differently than the remaining regions in accordance with a user selection of output quality, wherein said processing includes pixel clustering of at least one of said regions;
   merging the processed regions to produce a representative image; and
   compressing the representative image.

2. The method of claim 1, further comprising:
   receiving a grayscale continuous tone image;
   scaling the continuous tone image; and
   error diffusing at least a portion of the continuous tone image.

3. The method of claim 1, further comprising morphologically enhancing the text region.

4. The method of claim 1, wherein the processing includes error diffusion of continuous tone regions.

5. The method of claim 4, wherein said error diffusion utilizes a clustered halftone fill order.

6. A method for controlling image characteristics, comprising:
   receiving a scanned input image, wherein said input image includes an error-diffused portion and a text portion;
   segmenting the image to produce a segmented image;
   processing the segmented image in accordance with a user selection of an image characteristic, including employing a predetermined pattern for at least one error-diffused, continuous tone segment of the image;
   producing a representative image that includes at least a processed portion, said processed portion including an error-diffused, continuous tone segment in which the predetermined pattern has been employed, wherein the representative image is produced using a merging operation to combine at least one processed portion of an image with other portions of an image; and
   compressing the representative image.

7. The method of claim 6, wherein segmenting the image results in a plurality of regions, including at least one continuous tone region and one text region.

8. The method of claim 6, wherein the user selection of the characteristic is relative to image output quality and where processing of the segmented image includes pixel clustering of at least a portion of said image in response to the user selection.

9. The method of claim 8, wherein the user selection is determined via a user interface, and where the interface presents the user with a plurality of selections of varying image type and quality requirements.

10. The method of claim 6, further comprising:
    receiving a grayscale continuous tone image;
    scaling the continuous tone image; and
    error diffusing at least a portion of the continuous tone image to produce the input image.

11. The method of claim 6, further comprising morphologically enhancing the text region.

12. The method of claim 11, wherein morphologically enhancing the text region includes a closing operation.

13. The method of claim 6, wherein the processing includes error diffusion of continuous tone regions.

14. The method of claim 13, wherein said error diffusion utilizes a clustered halftone fill order.

15. The method of claim 14, wherein the pixel positions of the error diffused region follow a fixed pattern to facilitate compression of at least the continuous tone region.

16. A scanning services system for controlling image characteristics, comprising:
    a subsystem for digitizing a document and producing a representation thereof in the form of digital image data;
    an image processor for receiving the digital image data and producing a compressed image in accordance with a user selection of an image characteristic, said characteristic indicating a manner of processing at least a portion of the compressed image; and
    memory for storage of the digital image data and the compressed image,
    wherein said image processor (a) receives the digital image data representing a scanned input image and stores the digital image data in memory connected thereto, said image data including an error-diffused portion and a text portion, (b) segments the image into at least a continuous tone region and a text region, (c) processes at least one region in accordance with a user selection of output quality, including pixel clustering of at least one region, (d) merges the processed region to produce a representative image, and (e) compresses the representative image to produce the compressed image.

* * * * *